Feb. 16, 1965    A. PETRIW ETAL    3,170,068
SPHERICAL CHAMBER FOR MEASUREMENT OF VISIBILITY
Filed Jan. 3, 1962
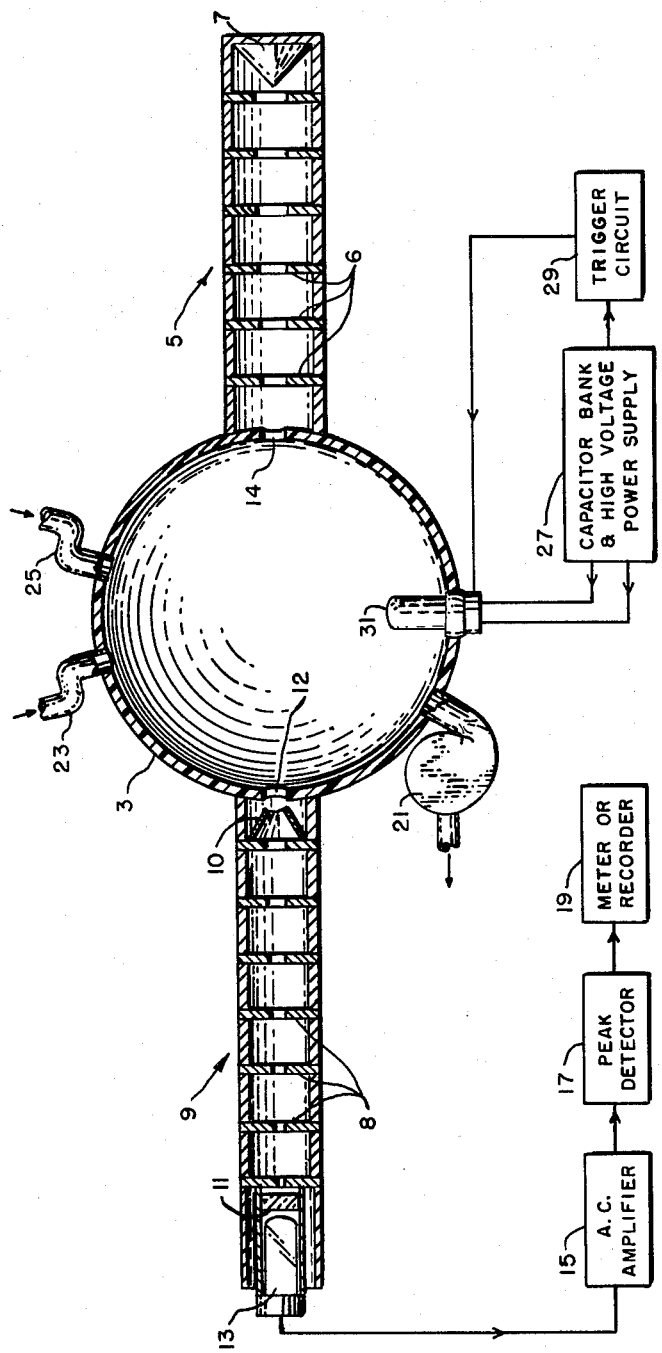
INVENTORS,
ANDREW PETRIW &
HELMUT WEICKMANN.
BY
Jack H. Linscott
ATTORNEY.

United States Patent Office 3,170,068
Patented Feb. 16, 1965

3,170,068
SPHERICAL CHAMBER FOR MEASUREMENT OF VISIBILITY
Andrew Petriw, West Belmar, and Helmut Weickmann, Interlaken, N.J., assignors to the United States of America as represented by the Secretary of the Army
Filed Jan. 3, 1962, Ser. No. 164,204
4 Claims. (Cl. 250—228)
(Granted under Title 35, U.S. Code (1952), sec. 266)

The invention described herein may be manufactured and used by or for the Government for governmental purposes without the payment of any royalty thereon.

The present invention relates to the measurement of visibility and more particularly to a device which can be used to accurately determine atmospheric visibility.

Light from distant objects suffers attenuation and dispersion in passing through the atmosphere due to scattering from minute solid particles and vapors suspended in the air as well as scattering from the air molecules themselves. Therefore, a measurement of the amount of light scattered by a sample of the atmosphere can be used to determine atmospheric visibility. Visibility depends on the total light scattering coefficient of the atmospheric aerosol, this coefficient being defined as the total light scattered in all directions. According to the present invention, the total light scattering coefficient of the atmosphere is measured by omnidirectionally illuminating an atmospheric sample by means of a brief intense flash of light and measuring the intensity of light scattered in one direction. The instant device has been developed in response to a need for relatively simple one-station, portable meter capable of yielding accurate quantitative data on atmospheric visibility.

It is therefore an object of this invention to provide a novel and useful atmospheric visibility meter. The structure and mode of operation of this meter as well as other objects and advantages of the device will become apparent from the following description and drawing, in which:

The sole figure illustrates a combined cross-sectional and block diagram of the device. The system essentially consists of an inclosed spherically-shaped chamber containing a sample of the atmospheric aerosol and means for measuring the brightness of that aerosol when subjected to intense and substantially omnidirectional illumination. Atmospheric samples are drawn into spherical chamber 3 by means of pump 21. Inlet tubes 23 and 25 are bent to prevent the entrance of stray light. The interior walls of chamber 3 are made highly efficient diffusive reflectors. Light source 31 is positioned inside of the chamber to provide a brief flash of light for illuminating the aerosol. Light source 31 may be a flash tube of the gas discharge type. The output of this type of tube is a brief, high intensity pulse of light with only a relatively small percentage of its energy in the infrared region. This will minimize the tendency of any condensed moisture in the aerosol to evaporate and therefore provide more accurate readings. Flash tube 31 is energized by means of a capacitor bank and high voltage power supply 27, which may be either manually or automatically initiated by trigger circuit 29.

With the spherical chamber shape and reflective, diffuse inner walls, the aerosol sample will be uniformly illuminated from all directions. Thus a measurement of the light scattered in one direction will indicate the total light scattering coefficient of the sample, from which the visibility can be determined. The light scattered along a diameter of chamber 3 is collimated by means of light trap 9 and converted to an electrical pulse by means of photomultiplier 13. Light trap 9 consists of a tube of circular cross-section mounted so that its central axis passes through the center of circular aperture 12. A series of discs 8 with central holes defines a light collimating and baffling system for observing scattered light along a diameter of the sphere and at the same time effectively prevenitng the admission of stray light directly from flash tube 31 and also light reflected from the chamber walls. The problem of stray light is aggravated by high peak intensity of illumination in the chamber compared to the small magnitude of light scattered. A light trap 5, diametrically opposite collimating light trap 9, provides a contrasting black background for the scattering sources. The structure and operation of 5 is similar to light trap 9, except that it is terminated with a cone-shaped baffle 7, instead of a phototube. All of the interior surfaces of the light traps are of a non-reflective black finish. The apertures in discs 6 and 8, as well as chamber apertures 12 and 14, get progressively larger from left to right, as illustrated in the drawing. This provides a divergent field of view which compensates for the inverse-square law decrease in the apparent intensity of light received from the particles toward the right side of the chamber. In practice, the two or three leftmost discs are chosen with properly tapered apertures to form the desired conical, divergent field of view. All of the remaining apertures in discs 6 and 8, as well as 12 and 14, are then designed to generally follow the conical field of view as defined by the leftmost discs, but are slightly recessed therefrom. This removes the inner edges of all the remaining apertures from the field of view and therefore prevents reflections of stray light from these inner edges from reaching photomultiplier 13. The element 11 is a means for spreading out the narrow pencil beam formed by 9 so that it covers substantially the entire photo-sensitive cathode of tube 13. This increases the dynamic range of the instrument by reducing the possibility of saturation of the cathode of tube 13. Element 11 may, for example, be a disc of ground glass or a concave, diverging type lens.

The illustrated optical system, with a relatively narrow field of view and efficient stray light baffling makes possible a high signal-to-noise ratio.

The output of photomultiplier 13 is passed through wide band alternating current amplifier 15, peak detector 17 and then to a meter or recorder 19. The use of a wide band A.C. amplifier blocks the D.C. component in the pulse output of photomultiplier 13, while passing all of the significant alternating current components which make up the Fourier spectrum of the pulse. Thus the drift problems associated with direct current amplifiers and the effects of steady-state stray background light are eliminated.

While a preferred embodiment of the invention has been illustrated, it is obvious that many changes can be made in the device without departing from the spirit and scope of the invention. Hence the invention should be limited only by the scope of the appended claims.

What is claimed is:
1. A device for the measurement of atmospheric visibility comprising; a spherically-shaped chamber with highly diffusive reflective walls, means to produce a high intensity pulse of light within said chamber, said means comprising an electronic flash tube positioned within said chamber, means to draw a sample of the atmosphere into said chamber, said last-named means comprising an exhaust pump and a plurality of inlet ports open to the atmosphere, means to observe the light scattered from said sample of the atmosphere along a diameter of said spherical chamber, said last-named means comprising a cylindrical tube mounted on the outside of said chamber with its axis centered on an aperture in said chamber, said tube containing a plurality of light baffling compartments formed by a plurality of discs mounted in spaced relation inside of said tube, said discs each having central holes defining a light admitting and collimating path along a diameter of said chamber, a photo-sensitive device mounted at the outer end of said tube, means to provide a non-reflective background on the wall of said chamber diametrically opposite said aperture, an alternating current amplifier connected to the output of said photo-sensitive device, a peak detector connected to the output of said amplifier and a recording device connected to said peak detector.

2. An atmospheric visibility meter comprising, a spherical chamber with highly diffusive reflective inner walls, means to produce a high intensity pulse of light within said chamber, means to draw a sample of the atmosphere to said chamber, means to observe the light scattered from said sample of the atmosphere along a diameter of said spherical chamber, said last-named means comprising a cylindrical tube mounted on the outside of said chamber with its axis centered on an aperture in said chamber, said tube containing a plurality of light baffling compartments formed by a plurality of discs mounted in spaced relation inside of said tube, said discs each having a central hole defining a light admitting and collimating path along an extension of a diameter of said chamber and means to sense and record the amount of light scattered by said sample of the atmosphere along said path.

3. A device for determining the total light scattering coefficient of an aerosol, comprising; a spherical chamber with highly diffusive reflective inner walls, means to draw a sample of the aerosol to be tested into said chamber, means to omnidirectionally illuminate said sample by means of a flash tube positioned within said chamber, means to observe the light scattered from said sample of the aerosol along a diameter of said spherical chamber, and means to sense and record the amount of light so observed.

4. An atmospheric visibility meter comprising a spherical chamber with highly diffusive reflective walls, means to draw a sample of the atmosphere into said chamber, means to omnidirectionally illuminate said atmospheric sample, and means to measure and record the amount of said illumination scattered along a diameter of said chamber.

References Cited by the Examiner
UNITED STATES PATENTS

| | | | |
|---|---|---|---|
| 1,883,116 | 10/32 | Tomlinson | 250—228 |
| 2,280,993 | 4/42 | Barnes | 88—14 |
| 2,684,008 | 7/54 | Vonnegut | 250—218 |
| 2,686,452 | 8/54 | Bentley | 250—228 X |
| 2,821,103 | 1/58 | Blet | 88—14 |
| 2,925,007 | 2/60 | Silver | 250—218 |

RALPH G. NILSON, *Primary Examiner.*
WALTER STOLWEIN, *Examiner.*